March 19, 1929.  I. F. GILES  1,706,153
INSULATOR FOR ELECTRIC CONNECTIONS
Filed March 7, 1925   2 Sheets-Sheet 1

Inventor
Isaac F. Giles,
By Bake, Macklin, Goedrich & Tean
Attorneys.

March 19, 1929. I. F. GILES 1,706,153
INSULATOR FOR ELECTRIC CONNECTIONS
Filed March 7, 1925 2 Sheets-Sheet 2
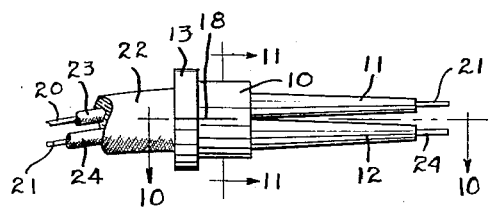
Fig.-8.
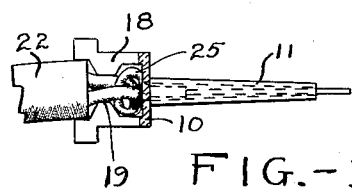
Fig.-10
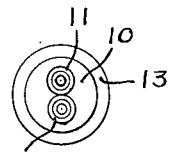
Fig.-9
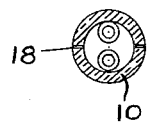
Fig.-11
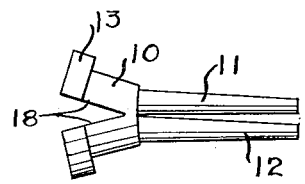
Fig.-12
Fig.-13
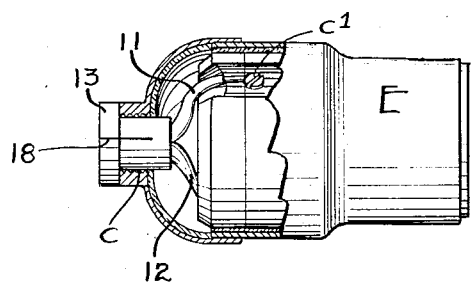
Inventor
Isaac F. Giles
By Bates, Macklin, Goldrick & Jean
Attorneys Patented Mar. 19, 1929.

1,706,153

UNITED STATES PATENT OFFICE.

ISAAC F. GILES, OF YONKERS, NEW YORK, ASSIGNOR TO ILEITE ELECTRIC MANUFACTURING CORPORATION, OF TUCKAHOE, NEW YORK, A CORPORATION OF NEW YORK.

INSULATOR FOR ELECTRIC CONNECTIONS.

Application filed March 7, 1925. Serial No. 13,676.

This invention is directed toward the prevention of short circuits in electrical insulating attachments, such as are used to effect separable connections with household devices, including sockets, socket-plugs, flat iron plugs, etc. The principal object of my invention therefore, is the provision of a simple device which may be readily placed over the wires adjacent the terminal connections so as to enable the connection to be made quickly and effectively, yet overcome the tendency of the wires to short circuit between the terminal connections. Moreover, my invention is concerned with the embodiment of a protecting unit in such form that it may be readily employed in existing devices without necessitating changes in the construction thereof.

I carry out the above object by employing preferably a soft hollow rubber article which is adapted to fit into the opening through which the current carrying wires are led into a device, and which has a body portion sufficiently large to receive the two twisted leads, and smaller spaced tubes leading from the body and adapted to receive the individual leads. Moreover, these tubes are flexible to permit the wires to be readily attached to the terminal binding screws. Thus, the individual wires are insulated effectively from each other, yet are accessible for an attachment to the terminal connections, and any troublesome taping is avoided.

Figure 1:
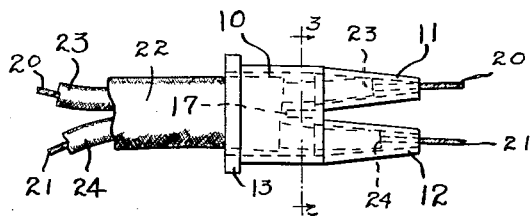
Figure 2:
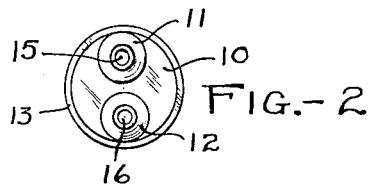
Figure 3:
Figure 4:
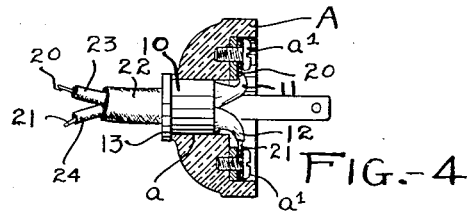
Figure 5:
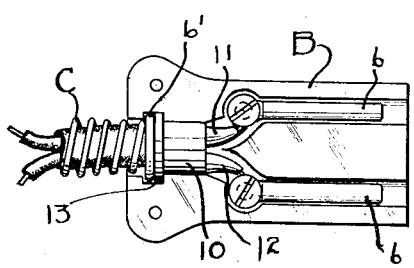
Figure 7:
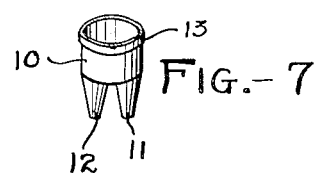
Figure 6:
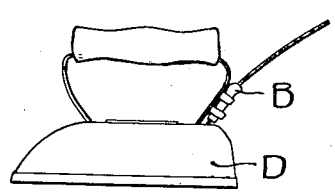

I have illustrated my invention in connection with different forms of electrical attachments, wherein Fig. 1 is a side elevation of a device embodying my invention; Fig. 2 is an end elevation of the device shown in Fig. 1; Fig. 3 is a section taken on a plane indicated by the line 3—3 in Fig. 1; Figs. 4, 5 and 6, are diagrammatic views illustrating the adaptation of my invention to various devices; Fig. 7 is a perspective of my device, unapplied; Fig. 8 is a side elevation of a somewhat different embodiment of my invention, designed more particularly for use with a socket; Fig. 9 is an end view of the structure shown in Fig. 8; Fig. 10 is a longitudinal section of this embodiment on a plane indicated by the line 10—10 on Fig. 8; Fig. 11 is a cross-section on a plane indicated by the line 11—11 on Fig. 8; Fig. 12 is a side elevation of this embodiment of the invention, illustrating the split body spread apart; Fig. 13 is a sectional side elevation of a socket, showing my insulating bushing therein.

I prefer to construct the attachment shown in the drawings of flexible electrical insulating material such as soft rubber, and to this end I have illustrated my invention as comprising a hollow rubber article having a body portion 10 and having tubular portions or legs 11 and 12 which protrude from the body portion. The body as illustrated comprises a hollow cylinder, one end of which is open to receive the two insulated wires 20 and 21, and their encasing braided tubing 22 if such is employed. The outer diameter of the body portion 10 of my bushing is such as to effect a snug fit within the device to which my attachment is applied, while the interior portion is sufficiently large to receive the wires and their complete covering.

The tubular members protruding from the body portion have hollow passage-ways 15 and 16 through which the wires respectively may extend. In the preferred form the opening in each tubular member is sufficiently large to receive only one wire with the individual insulation 23 or 24 thereon. Moreover the tubular members are integral with the body portion and are flexible so as to permit the individual wires to be bent at an angle to the body portion for enabling a connection to be made with the terminal binding screws.

I prefer to make the two tubular extensions internally tapered—that is, converging toward the free end—so that the individual conductors with their individual insulation 23 and 24 may be inserted within the tubular conduits, but only the bare wire can protrude from such conduits. Accordingly in using the device the individual insulation is stripped far enough back from the end so that the individual insulation will enter the tubular conduit but none of such insulation will extend beyond the conduit. This enables the tubular portions to extend close to the binding screws without danger of the insulation about the wire strand projecting beneath the binding screw, which would interfere with tight connections.

In Fig. 4, a device embodying my invention is shown with a separable plug A which has an opening $a$ into which the body portion 10 is arranged to extend and which it preferably fits quite snugly. Then a shoulder in the nature of a flange 13 on the body portion engages the outer end of the plug, positioning the attachment with reference to the plug, and giving a neat appearance. The legs of my bushing, it will be seen, extend nearly to the binding screws a'.

The use of the bushing and flexible tubes 11 and 12 is clearly illustrated with the flat iron plug B shown in Fig. 5, wherein the bushing legs are bent outwardly to permit attachment of the wires to the terminal connections b. This device embodies a plug which is arranged to be used with a flat-iron D shown in Fig. 6. In this instance, the flange 13 on the bushing readily occupies the same groove b' in the separable plug as the large end of the spring C, used to prevent kinking the cord.

In the insulating bushing above described, I find it advantageous to form an internal partition 17 extending diametrically across the body between the orifices to the two legs, as shown in Figs. 1 and 3. This partition functions to further prevent short circuiting should the individual wires become twisted on each other and the individual insulation broken within the body of the bushing. It also adds some rigidity to the bushing.

Figs. 8 to 12 inclusive illustrate another characteristic which may be embodied in my bushing, namely the body portion may be split from the extreme end substantially to the base of the body, as indicated at 18, and the interior of the body may be provided with semi-annular ribs 19, so that when the body is closed, a chamber with a reduced entrance is formed adjacent the base of the body. Such chamber provides a space for the reception of the knot 25 formed in the two individually insulated wires.

In applying the split device shown in Figs. 8 to 12, a portion of the outside braided tubing is first removed, then the two individually insulated wires are tied in a knot and thus the free portions are cleared of insulation for a certain distance from their ends, then the two individually insulated wires are extended into the two legs 11 and 12 of my insulating member, the bare ends of the wires protruding beyond such legs. The body of the bushing open at this time allows the placing of the knot. When the body is closed the knot is confined within the bushing and the individual insulation terminates at some point within the legs and only the bare wires extend beyond the legs. Now, the bushing with the enclosed wires is passed through the opening in the socket, or other attaching member, and the portion thereof which receives the body of the bushing maintains it snugly together.

Fig. 13 shows the split bushing construction in place within a socket E. The body snugly occupies the socket bore C, the flange 13 of the bushing lying outside of the socket and against the end thereof, and the flexible legs of the bushing being bent laterally within the socket so that the exposed bare ends are brought adjacent the two binding screws C'.

Whichever embodiment of the device is used, it will be noticed that it is adaptable for employment with existing constructions. My insulating bushing may be very cheaply manufactured, is readily applied and is very efficient for the object intended.

Having thus described my invention, I claim:

1. A device of the character described embodying a unitary soft rubber article having a hollow body portion and a pair of tubular portions leading from one end of the body portion, the body portion being split from its free end and having an internal transverse ridge, the body portion having such size that it may receive a pair of current carrying members with a knot beyond the ridge and the tubular portions having such size that each may receive only one of the current carrying members.

2. A device of the character described embodying a soft rubber bushing, one end thereof open and the opposite end thereof substantially closed, the bushing being diametrically split from the open end nearly to the closed end and provided with an external split annular flange adjacent the open end, and a pair of tubular extensions leading from the body adjacent the closed end, each adapted to receive an electrical conductor.

3. As a new article of manufacture, an insulating device of soft rubber comprising a bushing split from one end and having at the other end a pair of tubular extensions.

4. As a new article of manufacture, an insulating device of soft rubber comprising a bushing having an internal projection and having at one end a pair of tubular extensions leading respectively from opposite sides of the partition.

5. A device of the character described embodying a soft rubber bushing, one end thereof open and the opposite end thereof substantially closed, said open end being sufficiently large to receive a pair of insulated current carrying members, and a pair of tubular extensions leading from the closed end, said extensions each being internally tapered to provide a bore adjacent the body sufficiently large for an individual wire with its individual insulation and small enough at the end to receive only the bare wire, whereby the individual insulation may terminate within the tubular extension.

6. In combination, a relatively rigid member having an opening therein, a relatively flexible insulating member fitting within said opening, said flexible member having a comparatively short tubular body portion with an external flange adjacent one end and having a pair of tubular portions projecting from the opposite end, said flange coacting with the rigid member to limit axial movement of the flexible member, a pair of current carrying members disposed within the body portion, one of the members extending through one of the tubular portions, the other of said members extending through the other of said tubular portions, and each projecting beyond the end thereof, and terminal connections associated with the relatively rigid member, said tubular portions leading respectively to points adjacent said terminal connections, said current carrying members being respectively connected to the terminal connections beyond the tubular portions.

7. A device of the character described embodying a member of electrical insulating material having a hollow body portion and spaced conduits leading from one end of the body portion, the body portion being longitudinally split from the other end along a plane passing between said conduits and said body portion being sufficiently large to receive a pair of electrical conducting members, and the conduits being flexible and sufficiently large to receive individual electrical conducting members respectively.

In testimony whereof, I hereunto affix my signature.

ISAAC F. GILES.